United States Patent [19]
Campbell et al.

[11] 4,239,337
[45] Dec. 16, 1980

[54] MAGNETO-OPTIC MODULATOR USING DIELECTRIC MIRRORS

[75] Inventors: Joe C. Campbell, Middletown, N.J.; Kam-Yin Lau, Pasadena, Calif.; Julian Stone, Rumson, N.J.

[73] Assignee: Bell Telephone Laboratories, Incorporated, Murray Hill, N.J.

[21] Appl. No.: 46,954

[22] Filed: Jun. 8, 1979

[51] Int. Cl.³ .............................................. G02F 1/09
[52] U.S. Cl. ................................................... 350/151
[58] Field of Search ........................ 350/147, 150, 151

[56] References Cited

U.S. PATENT DOCUMENTS

| | | | |
|---|---|---|---|
| 3,313,938 | 4/1967 | Peters | 350/150 |
| 3,325,646 | 6/1967 | Reichel et al. | 350/150 |
| 3,420,601 | 1/1969 | Young | 350/151 |
| 3,610,729 | 10/1971 | Rogers | 350/147 |
| 3,622,225 | 11/1971 | Buchman et al. | 350/147 |
| 3,675,022 | 7/1972 | Nelson | 350/150 |
| 3,707,321 | 12/1972 | Jaecklin | 350/151 |

*Primary Examiner*—John K. Corbin
*Assistant Examiner*—R. A. Rosenberger
*Attorney, Agent, or Firm*—Daniel D. Dubosky

[57] ABSTRACT

A magneto-optic modulator of the bounce-cavity type is disclosed wherein the mirrors that are attached to the garnet crystal to provide the reflections are multilayered dielectric mirrors. By polarizing the input beam such that its E vector is perpendicular to the plane of incidence substantially total reflection is achieved from the mirrors and all of the input beam emerges from the garnet crystal. A metal film deposited on a plane of the crystal that is perpendicular to the mirrors permits the establishment of a magnetic field that is substantially parallel to the reflected beams within the crystal. When the field is established by passing current through the film, much of the light is lost during each of the reflections since substantial amounts of the polarized light having polarizations in the plane of incidence are coupled through the dielectric mirrors. Hence the intensity of the output beam is modulated by the current in the metal film.

10 Claims, 4 Drawing Figures

MAGNETO-OPTIC MODULATOR USING DIELECTRIC MIRRORS

BACKGROUND OF THE INVENTION

This invention relates to magneto-optic modulators of the bounce-cavity type.

A Nd:YAG fiber laser can operate at wavelengths of about 1.3 micrometers. At this wavelength fiber waveguides can be made that have both low loss and low dispersion. Unfortunately, due to the long fluorescent lifetime of the YAG crystal, high speed modulation of the output from this laser cannot be achieved by direct modulation of the pump diode current. Hence the Nd:YAG fiber laser requires an external modulator.

One type of magneto-optic modulator which can be utilized with a Nd:YAG fiber laser can be fabricated from garnet crystals. The magnetic garnets exhibit very high absorption at wavelengths shorter than 1.1 micrometers, but they can be made relatively transparent in the wavelength range of interest for fiber guide transmission from 1.1 micrometers to 1.5 micrometers, and they have an adequate figure of merit. Moreover, for magneto-optic devices, the drive power is proportional to the wavelength $\lambda$ and, therefore, they become more attractive at longer wavelengths than electrooptic modulators where the drive power increases in accordance with $\lambda^3$.

One type of prior art magneto-optic bounce-cavity type modulator that could be used is disclosed in U.S. Pat. No. 3,420,601 to R. W. Young et al issued Jan. 7, 1969. In this type of modulator a polarized input beam is reflected by two mirrors that are formed on opposite surfaces of a magneto-optic crystal. An electrical coil surrounding the crystals permits a current in the coil to determine whether or not the polarization of the input beam will be changed in passing through the crystal. An output polarization analyzer is placed in the path of the output beam and oriented so as to couple only the polarization that corresponds to an unmodified reflected input beam. As a result, changes in the coil current can modulate the intensity of the beam that appears at the output of the polarization analyzer.

SUMMARY OF THE INVENTION

The present invention provides a bounce-cavity magneto-optic modulator that does not require an output polarization analyzer. In accordance with the present invention a garnet crystal is sandwiched between two multilayered dielectric mirrors that are mounted on opposite parallel surfaces of the crystal in place of the usual metal mirrors in a bounce-cavity modulator configuration. The polarization of the input beam to the modulator is arranged to be perpendicular to the plane of incidence. By applying a magnetic field to the crystal that is substantially aligned with the transmission path of the reflected beams within the crystal, the polarization of the beam within the crystal is rotated. The dielectric mirrors are constructed such that they totally reflect the polarization that is perpendicular to the plane of incidence and only partially reflect the polarization components that are in the plane of incidence. As a result, an application of this magnetic field can cause substantially all of the input beam to leak out of the cavity through the dielectric mirrors before the input beam emerges from the crystal. Accordingly, variations in the intensity of the magnetic field can be used to modulate the intensity of the output beam from the crystal.

It is a feature of the present invention that the magnetic field, whose vector is substantially in line with the transmission path of the internally reflected beams, is established by a current in a metal film that is formed over a surface of the crystal substantially perpendicular to both of the surfaces to which the dielectric mirrors are mounted. This metal film can be deposited directly on the garnet crystal or can be isolated from the crystal by an insulating layer in order to reduce the losses in optical intensity that are encountered due to the close proximity of a metal film.

BRIEF DESCRIPTION OF THE DRAWING

The invention will be more readily understood after reading the following detailed description in conjunction with the drawings wherein.

DETAILED DESCRIPTION

In the embodiment of the invention to be described herein below components of the light that are polarized perpendicular to the plane of incidence will be designated by the subscript s and components that are polarized perpendicular to the direction of propagation and are in the plane of incidence will be designated by the subscript p in accordance with standard optical notation. The plane of incidence is, of course, defined by both the incident and reflected rays of light from a reflected surface.

Figure 1:
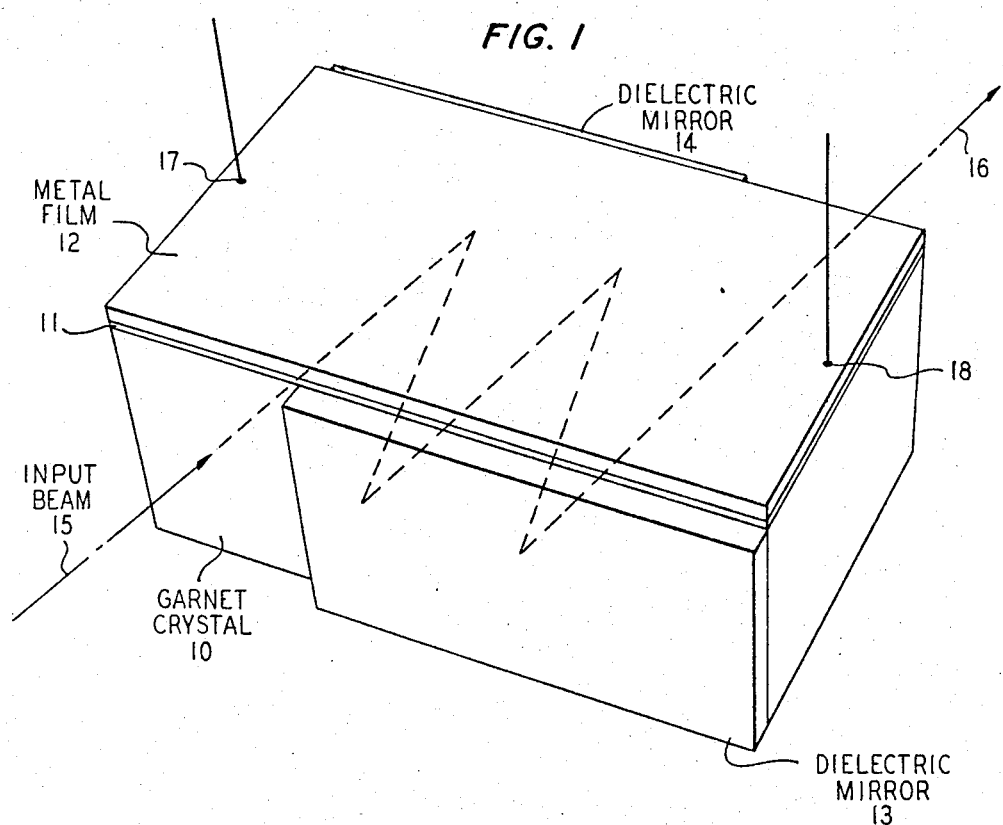
FIG. 1 is a pictorial illustration of a magneto-optic modulator constructed in accordance with the present invention.

The embodiment of the invention shown in FIG. 1 is constructed by using a yttrium iron garnet (YIG) crystal that has at least two parallel polished faces. An insulating layer 11 of silicon dioxide is deposited over a surface that is perpendicular to the two parallel polished surfaces. A metal film 12 is then deposited over the surface of the silicon dioxide layer 11 and electric contacts 17 and 18 are made to opposite ends of metal film 12. Insulating layer 11 advantageously separates the metal film from light that is propagating in the garnet crystal 10 and thereby avoids excessive losses that would be encountered with a direct contact of the metal film to the garnet crystal. Two dielectric mirrors 12 and 14 are then epoxied to the two parallel polished surfaces of garnet crystal 10. They are offset as shown in FIG. 1 so as to permit an input beam 15 to impinge directly on an area of one of the parallel surfaces of garnet crystal 10. With this beam 15 oriented at an angle other than normal to the parallel surfaces (and therefore other than normal to dielectric mirror 14), beam 15 can be caused to reflect from mirror 14 with the reflected ray being, in turn, reflected by mirror 13. As a result, multiple bounces can be caused to occur in the garnet crystal 10 within the cavity defined by dielectric mirrors 13 and 14 before output beam 16 emerges from the crystal at an area of the polished face (not shown) opposite to that of dielectric mirror 13.

With the input beam polarized in the s direction, that is, perpendicular to the plane of incidence, substantially all of the input beam will emerge as output beam 16 providing no current is caused to flow through metal film 12. As will be described hereinbelow, a current that flows from electric contact 17 through metal film 12 to electric contact 18 can cause the polarization of the input beam to be rotated within the crystal thereby causing substantially all of the light to be leaked out of both dielectric mirrors. As a result, the intensity of input beam 15 can be modulated by a current that is caused to flow in metal film 12.

Figure 2:
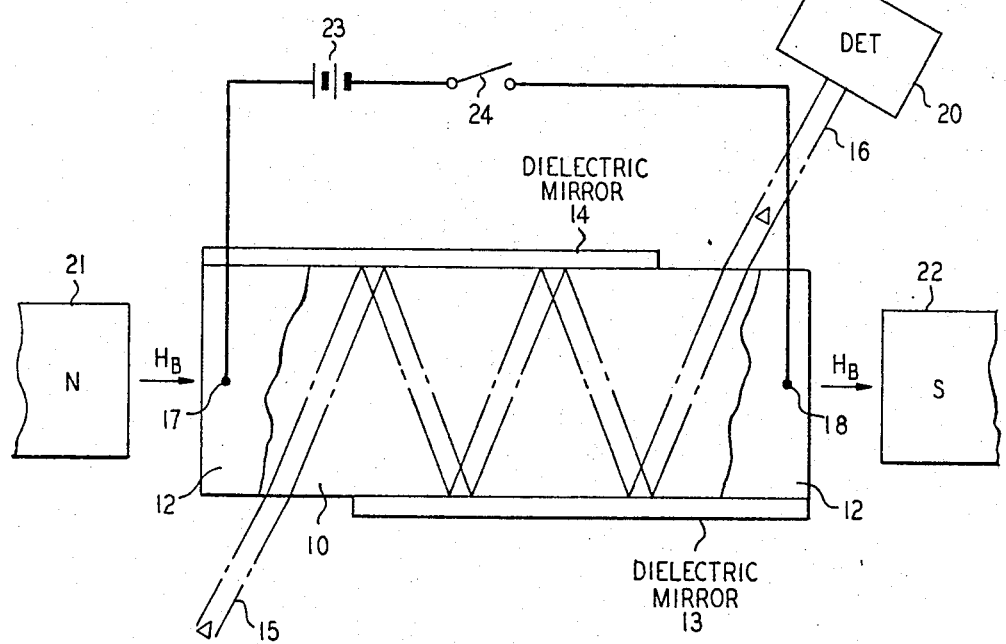
FIGS. 2 and 3 are schematic diagrams of a magneto-optic modulator in an environment that illustrates its usefulness to modulate an input light beam.
Figure 3:
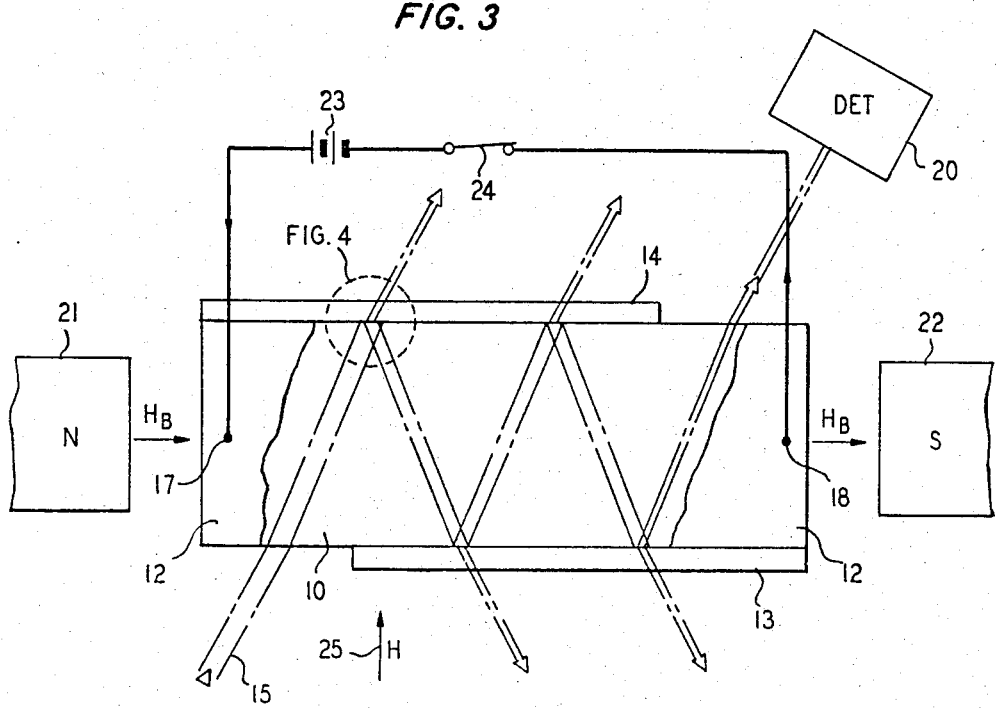

Operation of the device shown in FIG. 1 can be illustrated by the schematic diagrams shown in FIGS. 2 and 3. In both figures the garnet crystal 10 is being viewed from above the surface to which the insulating layer 11 and metal film 12 are deposited. Metal film 12 is, therefore, shown broken away from the center of the crystal in order to illustrate how the light beams propagate through garnet crystal 10. The elements in FIGS. 2 and 3 that have identical numeral designations to those shown in FIG. 1 are constructed in the same way as described hereinabove in connection with FIG. 1.

In FIG. 2 electrical contact 17 is connected to the positive terminal of a potential source 23 and the negative terminal of this source is connected through a normally open switch 24 to electric contact 18. Elements 23 and 24 are, of course, merely symbolic inasmuch as the currents established between contacts 17 and 18 are more likely to be provided by an electronic circuit. The magneto-optic modulator of FIG. 1 is oriented in FIG. 2 such that a dc magnetic field $H_B$ is parallel to mirrors 13 and 14. This field is shown in FIG. 2 as being developed between poles 21 and 22 of a magnet. In practice, of course, this dc bias field can also be provided by an external coil driven by a dc current. This dc magnetic field $H_B$ merely serves to bias the domains of garnet crystal 10 in a direction substantially perpendicular to the transmission path of the reflected beams within the garnet crystal. With only this field applied the polarization of input beam 15 remains essentially unchanged as it passes through the crystal. Since the input beam 15 is polarized such that it is perpendicular to the plane of incidence, substantially all of the beam is reflected from each of the dielectric mirrors 13 and 14 in propagating through crystal 10. Accordingly, all of beam 15 is free to propagate through crystal 10 and appear as output beam 16 at the input of a utilization device such as detector 20 in FIG. 2.

In the embodiment that was constructed, input beam 15 had a wavelength of 1.15 micrometers. At this wavelength, absorption in the YIG crystal is low (less than 5 dB per centimeter), and Faraday rotation at this wavelength is approximately 300 degrees/cm giving a figure of merit of 60 degrees/dB. Dielectric mirrors 13 and 14 were constructed to be highly reflective at 1.15 micrometers having a reflectivity of 99.9 percent when the ray being reflected is at normal incidence. The amplitude reflectivity, $\rho$, versus wavelength provides a curve with a plateau of high reflectivity centered about 1.12 micrometers. As the angle of incidence increases, the plateau peak shifts to shorter wavelengths and becomes narrower. Furthermore, this change that occurs is different for the s and p polarizations. Specifically, the width of this reflectivity peak decreases faster with changes in the angle of incidence for the p polarization than for the s polarization. For the dielectric mirrors that were used at 1.15 micrometers, the reflectivity for s polarization, $\rho_s$, remained at unity up to an angle of incidence equal to 50 degrees, but the reflectivity for the p polarization $\rho_p$ began to decrease at an angle of incidence equal to 20 degrees. Thus, for incidence angles between 20 degrees and 50 degrees, the dielectric mirrors can be made to be semilossy for p polarization and perfectly reflecting for s polarization. In the device which was constructed, input beam 15 was caused to strike dielectric mirror 14 at an angle of incidence equal to 45 degrees. The angle of propagation inside the crystal is determined by Snell's law and is less than 45 degrees. At this angle, $\rho_s$ is approximately 1.0 and $\rho_p$ is approximately 0.7. The length of the device was constructed so as to permit at least six reflections within the cavity defined by mirrors 13 and 14.

Figure 4:
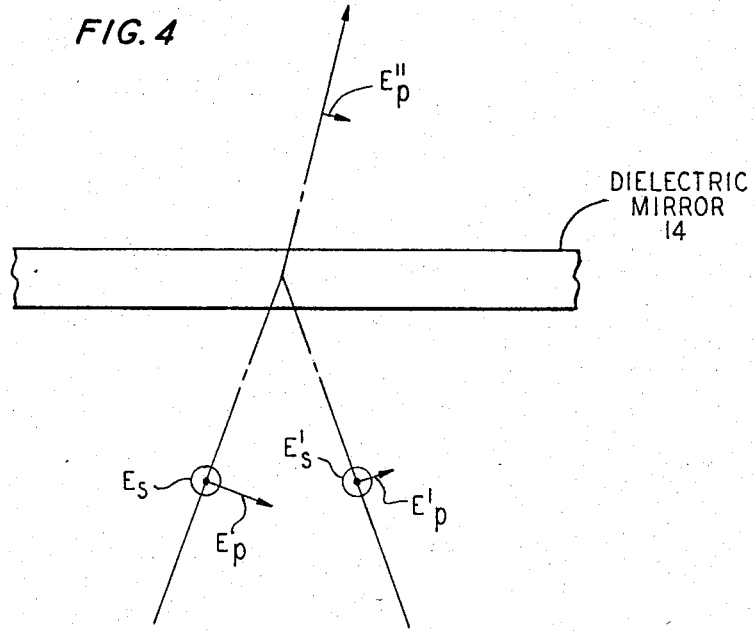
FIG. 4 is a vector ray diagram that is useful in explaning the effect of the dielectric mirror on the polarized light beam in the garnet crystal when current is passed through the metal film.

In FIG. 3 switch 24 is closed thereby causing a current to flow in metal film 12 which in turn establishes a magnetic field 25 in garnet crystal 10. This magnetic field 25 is substantially parallel to the direction of transmission of light beams in crystal 10. As a result, this magnetic field causes the polarization of input beam 15 to be rotated as it passes through crystal 10. When the input beam arrives at the point to be reflected by mirror 14, the beam not only has a component that is polarized in the s direction, but also has a component with polarization in the p direction, that is, a component in the plane of incidence. As indicated in FIG. 4, the component $E_s$ which is perpendicular to the plane of incidence is totally reflected by mirror 14 to produce a component with a polarization in the same direction indicated in FIG. 4 by $E_s'$. The component $E_p$ having polarization in the plane of incidence is both reflected, and appears as $E_p'$ in the reflected ray, and transmitted through mirror 14 to appear as $E_p''$ in a transmitted wave. As indicated in FIG. 3, each time that the beam is reflected by one of the mirrors 13 and 14 a portion of the intensity of the beam is lost since the components of the beam with p polarization are not totally reflected by the mirrors. As a result, the intensity of the beam that reaches detector 20 is substantially reduced from the intensity of input beam 15. This decrease in the intensity is symbolically illustrated in FIG. 3 by a decrease in the width of the reflected beam. This is, of course, not to be taken as an indication that the actual beam width has changed.

Intuitively, it might appear that loss from the cavity when the current is present in metal film 12 would be most efficient if $\rho_s$ equals 1 and $\rho_p$ equals 0. It can be shown, however, that the leakage of light from the cavity is most efficient when $\rho_s$ equals 1 and $\rho_p$ is greater than 0. The equations utilized to show this relationship are presented hereinbelow as Appendix 1. For the embodiment that was constructed using a YIG crystal having a thickness of about 0.07 centimeters, a Faraday rotation, $\theta$, of 15 degrees per pass was achieved. The power emerging from the modulator after 2 N bounces, $P_{2N}$, as expressed by Equation 17 of the appendix can be plotted versus N by using this value of $\theta$ for various values of $\rho_p$. For this value of $\theta$, the plot reveals that the power decreases at the fastest rate when $\rho_p$ equals 0.7. This behavior can be explained by comparing the lossy modulator cavity to a damped harmonic oscillator. The Faraday rotation can be regarded as an oscillation, while the loss suffered during reflections is analogous to a damping source. When $\rho_p$ is too low, the oscillator is overdamped and conversely, when $\rho_p$ approaches unity, the system is underdamped. There always exist a certain value of $\rho_p$ greater than 0 such that the oscillator dissipates its energy most efficiently.

What has been described hereinabove is merely an illustrative embodiment of the present invention. Numerous departures may be made by those skilled in the art without departing from the spirit and scope of the invention. For example, a magneto-optic material other than yttrium iron garnet can be utilized as the medium. In addition, the magnetic field that is substantially parallel to the path of the reflected beams can be established by a coil that is external to the basic modulator.

APPENDIX

The electric field of the light wave can be denoted by a column vector, representing the two components of the field $$\vec{E} = \begin{pmatrix} E^p \\ E^s \end{pmatrix} \quad (1)$$

As light passes through the modulator, the rotation of the electric field vector can be represented by the rotation operator:

$$G = \begin{pmatrix} \cos\theta & \sin\theta \\ -\sin\theta & \cos\theta \end{pmatrix} \quad (2)$$

where $\theta$ is the amount of Faraday rotation achieved in one pass across the cavity. The amplitude reflection at the mirror is described by a diagonal matrix operator, $r$, given by:

$$r = \begin{pmatrix} r_p & 0 \\ 0 & r_s \end{pmatrix} \quad (3)$$

The reflectivities $r_p$ and $r_s$ can be complex numbers, which means that there may be a phase shift associated with each reflection, and furthermore this phase shift can be different for p and s.

The incoming beam is represented as $$\vec{E_o} = \begin{pmatrix} E_o{}^p \\ E_o{}^s \end{pmatrix} \quad (4)$$

After the first pass across the cavity and before the first reflection, the beam has experienced rotation, and the electric field is $$\vec{E_1} = G \cdot \vec{E_o}. \quad (5)$$

After the first reflection, the electric field becomes $$\vec{E_1'} = (RG)\vec{E_o} \quad (6)$$

After 2 N transversals and bounces, the electric field can be written as $$\vec{E_{2N}} = (RG)^{2N}\vec{E_o} \quad (7)$$

$$= \begin{pmatrix} r_p\cos\theta & r_p\sin\theta \\ -r_s\sin\theta & r_s\cos\theta \end{pmatrix}^{2N} \vec{E_o}$$

by Using Sylvester's theorem this matrix can be transformed to the following form:

$$\vec{E_{2N}} = (r_p r_s)^N \cdot \quad (8)$$

$$\begin{pmatrix} \sqrt{\frac{r_p}{r_s}}\cos\theta\, U_{2N-1}(a) - U_{2N-2}(a) & \sqrt{\frac{r_p}{r_s}}\sin\theta\, U_{2N-1}(a) \\ \sqrt{\frac{r_s}{r_p}}\sin\theta\, U_{2N-1}(a) & \sqrt{\frac{r_s}{r_p}}\cos\theta\, U_{2N-1}(a) - U_{2N-2}(a) \end{pmatrix} \cdot \vec{E_o}$$

where $U_N(x)$ is the Chebyshev polynomial of the second kind of order N; and $$a = \frac{1}{2}\left(\sqrt{\frac{r_s}{r_p}} + \sqrt{\frac{r_p}{r_s}}\right)\cos\theta \quad (9)$$

If both $r_s$ and $r_p$ are real numbers, i.e., there is no phase shift upon reflection, then $a$ is real and the Chebyshev polynomial is given explicitly by $$U_N(a) = \begin{cases} \dfrac{\sin((N+1)\cos^{-1}a)}{\sqrt{1-a^2}} & \text{if } a < 1 \\ N+1 & \text{if } a = 1 \\ \dfrac{\sinh((N+1)\cosh^{-1}a)}{\sqrt{a^2-1}} & \text{if } a > 1 \end{cases} \quad (10)$$

If, on the other hand, $r_s$ and $r_p$ are complex, $a$ will be complex and the Chebyshev function will be given by $$U_N(a) = \quad (11)$$
$$\frac{\cos(N+1)m\,\sinh(N+1)n - i\sin(N+1)m\,\cosh(N+1)n}{\cos m\,\sinh n - \sin m\,\cosh n}$$

where m and n are related to the real and imaginary parts of $a$ by $$Re(a) = \cos m\,\cosh n \quad (12)$$
$$Im(a) = -\sin m\,\sinh n$$

For the calculations that follow we assume an incoming s wave, i.e., the input field is given by $$\vec{E_o} = \begin{pmatrix} 0 \\ 1 \end{pmatrix}$$

and we assume that $r_s = 1$, $r_p = |r_p|e^{-i\phi}$ where $\phi$ is the phase lag of p behind s upon reflection from the mirror. To simplify the notation, $|r_p|$ will be written as $\rho_p$. Equation 8 can then be written as:

$$E_{2N} = \rho_p{}^N e^{iN\phi} \cdot \begin{pmatrix} e^{i\phi/2}\sqrt{\rho_p}\cos\theta\, U_{2N-1}(a) & e^{i\phi/2}\sqrt{\rho_p}\sin\theta\, U_{2N-1}(a) \\ \quad - U_{2N-2}(a) & \\ \dfrac{e^{-i\phi/2}}{\sqrt{\rho_p}}\sin\theta\, U_{2N-1}(a) & \dfrac{e^{-i\phi/2}}{\sqrt{\rho_p}}\cos\theta\, U_{2N-1}(a) \\ & \quad - U_{2N-2}(a) \end{pmatrix} \cdot \begin{pmatrix} 0 \\ 1 \end{pmatrix} \quad (14)$$

where $$a = (\tfrac{1}{2})\sqrt{\rho_p}\left(\dfrac{e^{-i\phi/2}}{\rho_p} + e^{i\phi/2}\right)\cos\theta \quad (14a)$$

The modulator output then becomes $$\vec{E}_{out} = G \cdot \vec{E}_{2N} \quad (15)$$

and the power in the beam emerging from the modulator after 2 N bounds, $P_{2N}$, given by $$P_{2N} = |\vec{E}_{out}|^2 = |G|^2|\vec{E}_{2N}|^2 = |\vec{E}_{2N}|^2 \quad (16)$$

where $|G|$ is the modulus of matrix G and is equal to 1. We obtain from Equation 14, $$P_{2N} = (\rho_p)^{2N} \cdot \left[ (U_{2N-1}(a))^2 \left( \rho_p \sin^2\theta + \dfrac{\cos^2\theta}{\rho_p} \right) + \dfrac{2}{\sqrt{\rho_p}}\cos\dfrac{\phi}{2}\cos\theta\, U_{2N-1}(a)U_{2N-2}(a) + (U_{2N-2}(a))^2 \right] \quad (17)$$

We claim:

1. A magneto-optic modulator for modulating the intensity of an input light beam comprising, a magneto-optic material and two mirrors mounted in parallel planes with the magneto-optic material between the mirrors so as to establish a cavity in the material in which multiple reflections of the input beam from the mirrors can be confined, characterized in that, at least one of said mirrors is a multilayered dielectric mirror.

2. A magneto-optic modulator as defined in claim 1 wherein said magneto-optic material is a garnet crystal.

3. A magneto-optic modulator as defined in claim 2 wherein said garnet crystal includes the materials yttrium and iron.

4. A magneto-optic modulator as defined in claim 2 wherein said modulator further includes a metal film deposited on a plane of said crystal that is substantially perpendicular to the parallel planes of said mirrors.

5. A magneto-optic modulator as defined in claim 4 wherein said metal film is separated from said garnet crystal by an insulating layer.

6. A bounce-cavity magneto-optic modulator for amplitude modulation of the intensity of a linearly polarized input light beam in response to an input signal comprising, a magneto-optic medium having opposite parallel surfaces, reflecting means mounted on each of said parallel surfaces of said medium for reflecting said input light beam in a zig-zag path in said medium, and magnetic field means responsive to said input signal for changing the magnetic field in said medium so as to change the polarization of said input light beam, characterized in that said reflecting means includes at least one multilayered dielectric mirror.

7. A magneto-optic modulator as defined in claim 6 wherein said magneto-optic medium is a garnet crystal.

8. A magneto-optic modulator as defined in claim 7 wherein said garnet crystal includes the materials yttrium and iron.

9. A magneto-optic modulator as defined in claim 7 wherein said magnetic field means is a metal film deposited on said crystal on a surface that is perpendicular to said parallel surfaces.

10. A magneto-optic modulator as defined in claim 9 wherein said metal film is separated from said garnet crystal by an insulating layer.

* * * * *